United States Patent
Karunaratne et al.

(10) Patent No.: US 11,080,079 B2
(45) Date of Patent: Aug. 3, 2021

(54) AUTONOMOUSLY REPRODUCING AND DESTRUCTING VIRTUAL MACHINES

(71) Applicant: VMware, Inc., Palo Alto, CA (US)

(72) Inventors: Janitha Karunaratne, Austin, TX (US); Shruthi Rajashekar, Austin, TX (US); Brandon Nelson, Austin, TX (US)

(73) Assignee: VMWARE, INC., Palo Alto, CA (US)

( * ) Notice: Subject to any disclaimer, the term of this patent is extended or adjusted under 35 U.S.C. 154(b) by 136 days.

(21) Appl. No.: 16/247,122

(22) Filed: Jan. 14, 2019

(65) Prior Publication Data

US 2020/0225972 A1 Jul. 16, 2020

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45575* (2013.01)

(58) Field of Classification Search
CPC ....... G06F 9/45558; G06F 2009/45562; G06F 2009/4557; G06F 2009/45575
USPC .......................................................... 718/1
See application file for complete search history.

(56) References Cited

U.S. PATENT DOCUMENTS

| | | | | |
|---|---|---|---|---|
| 8,151,263 B1* | 4/2012 | Venkitachalam | ..... | G06F 9/5077 718/1 |
| 9,323,565 B2* | 4/2016 | Li | ....... | G06F 9/45558 |
| 2006/0155912 A1* | 7/2006 | Singh | ................... | G06F 11/2028 711/6 |
| 2013/0185716 A1* | 7/2013 | Yin | ...................... | G06F 16/1794 718/1 |
| 2015/0066844 A1* | 3/2015 | Yin | ..................... | G06F 9/45558 707/612 |
| 2015/0074662 A1* | 3/2015 | Saladi | ..................... | G06F 30/33 718/1 |
| 2015/0222515 A1* | 8/2015 | Mimura | .............. | G06F 9/45558 709/224 |
| 2016/0055021 A1* | 2/2016 | Beveridge | ............. | G06F 9/4451 718/1 |
| 2018/0060104 A1 | 3/2018 | Tarasuk-levin | | |

OTHER PUBLICATIONS

Lager-Cavilla et al., "SnowFlock: Rapid Virtual Machine Cloning for Cloud Computing", Apr. 1-3, 2009, EuroSys'09, 1-12 (Year: 2009).*

(Continued)

*Primary Examiner* — Bradley A Teets
(74) *Attorney, Agent, or Firm* — Thomas Horstemeyer, LLP

(57) ABSTRACT

Various examples are disclosed for autonomously reproducing and destructing virtual machines. Various virtual machines can be provisioned in a computing environment having at least one computing device. Each of the virtual machines provisioned can process a workload assigned to the at least one computing device. Further, each of the virtual machines can independently determine whether to self-replicate or self-destroy based at least on a state of processing of the workload. To self-replicate, each of the virtual machines can cause a new virtual machine to be created, where a processing of the workload is divided between a virtual machine and the new virtual machine created.

20 Claims, 4 Drawing Sheets

(56) References Cited

OTHER PUBLICATIONS

Wikipedia, "Fork (System Call)," https://en.wikipedia.org/wiki/Fork_(system_call) (Last visited: Oct. 18, 2018).
Wikipedia, "Copy-on-write," https://en.wikipedia.org/wiki/Fork_(system_call) (Last visited: Oct. 18, 2018).
VMware, "VMware Instant Clone Technology for Just-In-Time Desktop Delivery in Horizon 7 Enterprise Edition," https://blogs.vmware.com/euc/2016/02/horizon-7-view-instant-clone-technology-linked-clone-just-in-time-desktop.html (Last visited: Oct. 18, 2018).

* cited by examiner

AUTONOMOUSLY REPRODUCING AND DESTRUCTING VIRTUAL MACHINES

BACKGROUND

Data centers include various physical and virtual components that, when executed, provide web services, cloud computing environments, virtualization environments, as well as other computing systems. For instance, computer virtualization relates to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine. Operating a data center can involve maintaining hundreds to thousands of virtual machines as well as hardware of host machines, which include CPUs, GPUs, and other physical hardware. Virtual machines are created and destroyed by a central authority, such as a hypervisor or a virtual machine monitor (VMM), that includes computer software, firmware, hardware, or a combination thereof.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to virtual machines that autonomously reproduce or destructing to scale up or scale down processing of workloads. Today, workloads are processed by virtual machines at the instruction and direction of a virtual infrastructure orchestrator that is, for example, responsible for provisioning virtual machine. For instance, the virtual infrastructure orchestrator reacts to workload increases or decreases by scaling up and down the amount of virtual machines provisioned in an environment. While this configuration can be appropriate for processing workloads having a long processing life, it can be insufficient for processing workloads that can have a short processing life. For instance, to create and remove virtual machines that have a short processing life, a major processing burden is imposed on the virtual infrastructure orchestrator, creating substantial overhead in a virtualization environment.

According to various example describes herein, various virtual machines can be provisioned in a computing environment having at least one computing device. Each of the virtual machines provisioned can process a workload assigned to the at least one computing device. Further, each of the virtual machines can include logic that independently determines whether to self-replicate or self-destroy based at least on a state of processing of the workload. In other words, the virtual machines can determine whether to clone or destroy itself, for instance, to scale up or down processing of a workload. To self-replicate, each of the virtual machines can cause a new virtual machine to be created, where a processing of the workload is divided between a virtual machine and a new virtual machine created.

Further, in some examples, the virtual machines can include logic that independently determines whether to self-destruct based on a state of processing of the workload, an elapse of a predetermined amount of time, or other factors described herein. For instance, in response to a determination to self-destruct made by one of the virtual machines, the virtual machine can cause its own execution to be terminated, and the virtual machine to be deleted or otherwise removed from memory. Removal from memory can include, for example, deleting the virtual machine from a physical or virtual disk storage device. As such, the virtual machines in the virtualization environment can scale down processing of workloads autonomously and independent of a virtual infrastructure orchestrator.

Figure 1:
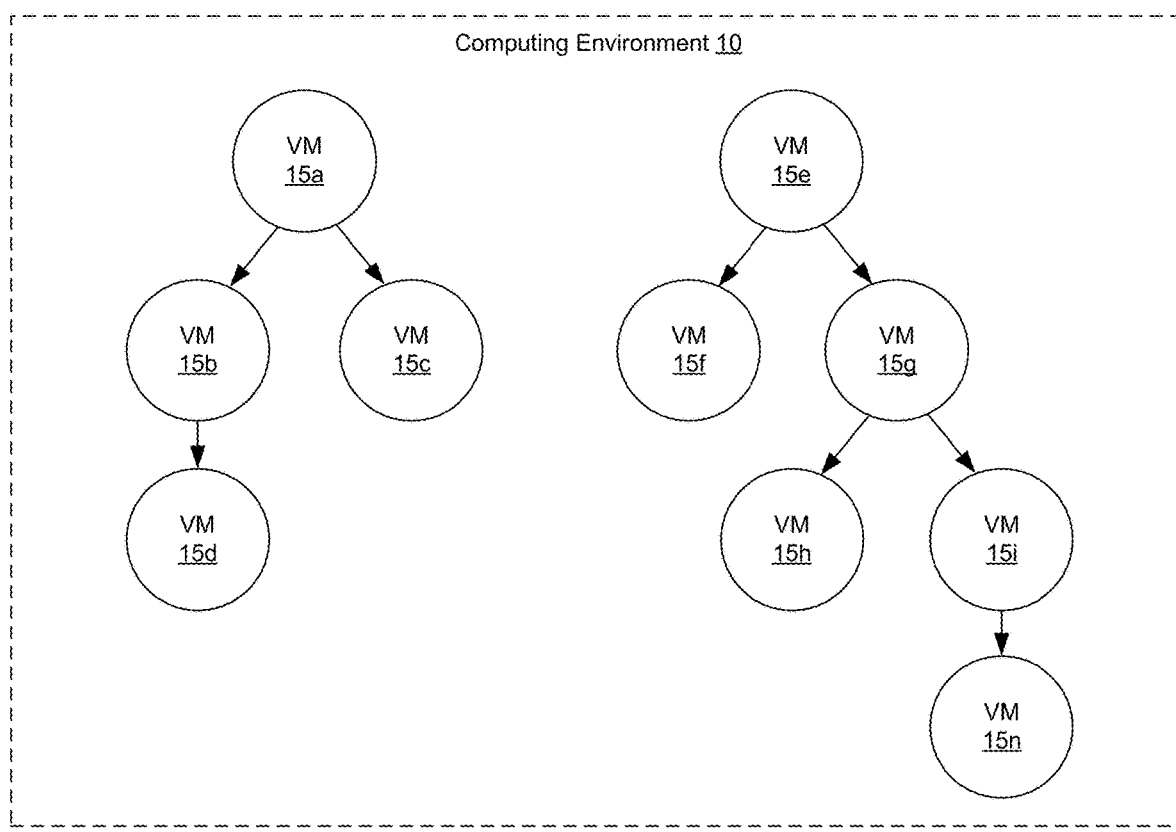
FIG. 1 is a drawing of virtual machines configured to autonomously reproduce or destruct.

Turning now to FIG. 1, a schematic diagram of a computing environment 10 is shown having a multitude of virtual machines 15a ... 15n (collectively "virtual machines 15") provisioned therein according to various examples. The computing environment 10 can include one or more computing devices, as will be described. As the computing environment 10 includes the multitude of virtual machines 15, as well as the corresponding virtualization hardware and software necessary to provision and operate the virtual machines 15, the computing environment 10 can be referred to as a "virtualization environment" in some examples. Each of the virtual machines 15 can process a portion of a workload to provide, for instance, virtual desktops or other service as will be discussed.

According to various examples, one or more virtual machines 15 can be provisioned in the computing environment 10, where the one or more virtual machines 15 include logic that autonomously determines whether to self-replicate and/or self-destruct. For instance, a first one of the virtual machines 15a, also referred to as a parent virtual machine 15a, can determine whether to provision child virtual machines 15b, 15c based on a state of processing of a workload. Further, each of the child virtual machines 15b can inherit properties of the parent virtual machine 15a. As such, a child virtual machine 15b can, like its parent virtual machine 15a, determine whether to self-replicate and/or self-destruct based on a state of processing of a workload. Accordingly, the virtual machines 15 enable virtualization environments to behave autonomously, similar to multicellular organisms.

Notably, the ability of the virtual machine 15 to determine whether to self-replicate or self-destroy is in contrast to how virtual workloads are typically deployed and managed today, where an external virtual infrastructure orchestrator is responsible for provisioning all the virtual machines, as well as reacting to load increases or decreases by scaling up and down. By leveraging self-replicate and self-destruct operations autonomously, the computing environment 10 is able to independently manage lifecycles, thereby leading to more efficient systems and reduced responsibilities for virtual machine orchestrators.

In some examples, a single virtual machine 15 is provisioned, where the single virtual machine 15 determines autonomously to self-replicate into multiple child virtual machines 15 having one or more purposes. Additionally, the virtual machines 15 created can self-organize and become a multi-virtual machine system. Conceptually, the self-replicate and self-destruct features of the examples described herein are analogous to cellular lifecycle in biology, where a single stem cell multiplies to form a multicellular organism. In addition to the initial deployment, self-replicate and self-destruct can be used to manage the lifecycle of a computing environment 10 by scaling up and scaling down autonomously.

Figure 2:
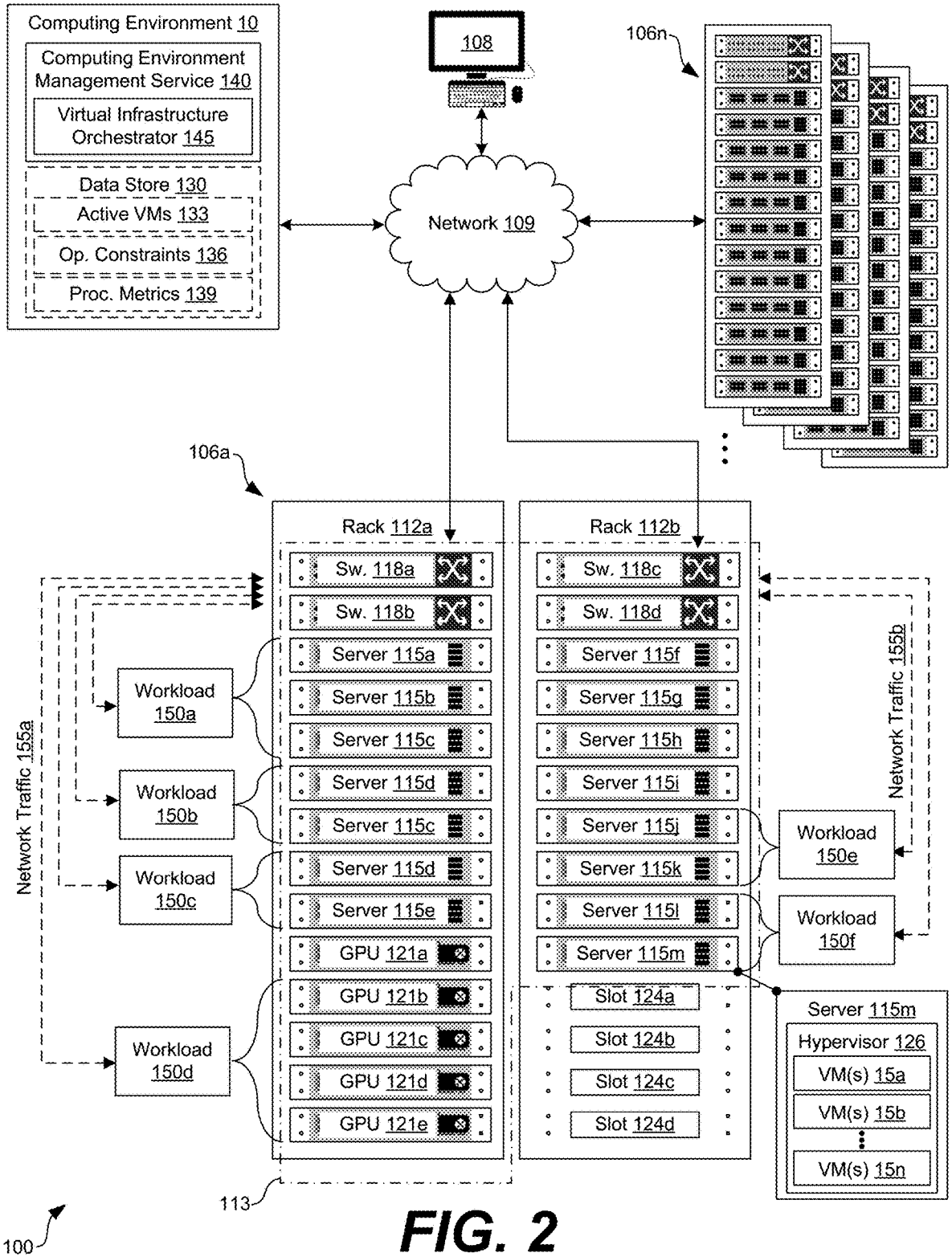
FIG. 2 is a drawing of an example of a networked computing environment having the virtual machines of FIG. 1 executing therein.

With reference to FIG. 2, an example of a networked environment 100 is shown. The networked environment 100 can include a computing environment 10 and various computing systems 106a . . . 106n (collectively "computing systems 106") in communication with one other over a network 109. The network 109 can include, for example, the Internet, intranets, extranets, wide area networks (WANs), local area networks (LANs), wired networks, wireless networks, other suitable networks, or any combination of two or more such networks.

The networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

In various embodiments, the computing systems 106 can include a plurality of devices installed in racks 112 which can make up a server bank, aggregate computing system, or a computer bank in a data center or other like facility. In some examples, the computing systems 106 can include high-availability computing systems. A high-availability computing system is a group of computing devices that act as a single system to provide a continuous and constant uptime. The devices in the computing systems 106 can include any number of physical machines, virtual machines, virtual appliances, and software, such as operating systems, drivers, hypervisors, scripts, and applications.

In some examples, a computing environment 10 can include an enterprise computing environment that includes hundreds or even thousands of physical machines, virtual machines 15, and other software implemented in devices stored in racks 112, distributed geographically, and connected to one another through the network 109. It is understood that any virtual machine 15 or other virtual appliance is implemented using at least one physical device, such as a server or other computing device.

The devices in the racks 112 can include various computing resources 113. The computing resources 113 can include, for example, physical computing hardware, such as memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage virtualization infrastructure or a cloud computing environment. In some examples, the computing resources 113 can also include virtual computing resources 113, such as virtual machines 15 or other software.

In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine 15, the server 115 can be referred to as a "host," while the virtual machine can be referred to as a "guest."

Each server 115, such as representative server 115m, can act as a host in the networked environment 100, and thereby can include a hypervisor 126 as well as one or more virtual machines 15. The hypervisor 126 can include a "Type I" hypervisor in some examples or, in other words, a hypervisor having its own operating system. Alternatively, the hypervisor 126 can include a "Type II" hypervisor or, in other words, a hypervisor configured to execute on a particular operating system.

The hypervisor 126 can be installed on a server 115 to support a virtual machine execution space within which one or more virtual machines 15 can be concurrently instantiated and executed. In some examples, the hypervisor 126 can include the ESX™ hypervisor by VMware®, the ESXi™ hypervisor by VMware®, or similar hypervisor 126. It is understood that the computing systems 106 are scalable, meaning that the computing systems 106 in the networked environment 100 can be scaled dynamically to include the addition or removal of servers 115, switches 118, GPUs 121, power sources, and other components, without degrading performance of a virtualization or cloud computing environment.

Referring now to the computing environment 10, the computing environment 10 can include, for example, a server 115 or any other system providing computing capability. Alternatively, the computing environment 10 can include one or more computing devices that are arranged, for example, in one or more server banks, computer banks, computing clusters, or other arrangements. The computing environment 10 can include a grid computing resource or any other distributed computing arrangement. The computing devices can be located in a single installation or can be distributed among many different geographical locations. Although shown separately from the computing systems 106, it is understood that in some examples the computing environment 10 can be included as all or a part of the computing systems 106.

The computing environment 10 can include or be operated as one or more virtualized computer instances in some examples. For purposes of convenience, the computing environment 10 is referred to herein in the singular. Even though the computing environment 10 is referred to in the singular, it is understood that a plurality of computing environments 10 can be employed in the various arrangements as described above. As the computing environment 10 communicates with the computing systems 106 and client devices 108 for end users over the network 109, sometimes remotely, the computing environment 10 can be described as a remote computing environment 10 in some examples. Additionally, in various examples, the computing environment 10 can be implemented in servers 115 of a rack 112 and can manage operations of a virtualized or cloud computing environment. Hence, in some examples, the computing environment 10 can be referred to as a management cluster in the computing systems 106.

The computing environment 10 can include a data store 130. The data store 130 can include memory of the computing environment 10, mass storage resources of the computing environment 10, or any other storage resources on which data can be stored by the computing environment 10. The data store 130 can include memory of the servers 115 in some examples. For instance, the data store 130 can include one or more relational databases, such as structure query language (SQL) databases, non-SQL databases, or other relational or non-relational databases. The data stored in the data store 130, for example, can be associated with the operation of the various services or functional entities described below.

The data store 130 can include a database or other memory that includes, for example, active virtual machines 133, operational constraints 136, processing metrics 139, as well as other data not discussed herein. The active virtual machines 133 can include information pertaining to virtual machines 15 actively executing in the computing systems 106. In some examples, the computing environment 10 can maintain the active virtual machines 15 as an array of data objects, linked list, hierarchical tree, or other suitable data structure.

The operational constraints 136 can include predefined constraints that, when met, permit the creation or destruction of virtual machines 15 in the computing systems 106. To this end, the operational constraints 136 can include a maximum number of virtual machines 15 or a minimum number of virtual machines 15 permitted to execute in the computing systems 106. Alternatively, the operational constraints 136 can include maximum usable computing resources 113, where new virtual machines 15 are permitted to be created until the maximum usable computing resources 113 have been allocated. Other operational constraints 136 can be used as can be appreciated.

The processing metrics 139 can include metrics describing an operational state of processing of workloads 150a . . . 150f (collectively "workloads 150"). For instance, the processing metrics 139 can describe a throughput of processing of the workloads 150. The processing metrics 139 can include metrics generated for a virtual machine 15 processing a workload 150 or a collection of virtual machines 15 processing a workload 150. For instance, the metrics may describe a throughput of the virtual machine 15 processing a workload 150 or a portion thereof. In some examples, each of the virtual machines 15 can access the operational metrics 139 describing the overall state of the system, permitting the virtual machines 15 to determine whether to clone or terminate autonomously based on an overall state of the system. In some examples, the virtual machines 15 can access the operational metrics 139 or other indication of whether the virtual machine 15 is under a heavy, moderate, or light load from a virtual machine orchestrator, a hypervisor 126, or other management component.

The components executed on the computing environment 10 can include, for example, a computing environment management service 140 as well as other applications, services, processes, systems, engines, or functionality not discussed in detail herein. The computing environment management service 140 can be executed to oversee the operation of the networked environment 100 through management of the computing systems 106 as well as the physical and virtual computing resources 113 that make up the computing systems 106. In some examples, an enterprise, organization, or other entity can operate the computing environment management service 140 to oversee or manage the operation of devices in the racks 112, such as servers 115, switches 118, GPUs 121, power supplies, cooling systems, and other components.

Additionally, in some examples, the computing environment management service 140 can include a virtual infrastructure orchestrator 145, also referred to as a virtual infrastructure management (VIM). Traditionally, the virtual infrastructure orchestrator 145 can oversee the creation and destruction of virtual machines 15 in the computing systems 106. However, in various examples herein, the virtual machines 15 can determine whether to self-replicate or self-destruct independent of the virtual infrastructure orchestrator 145. Additionally, in some examples, the virtual infrastructure orchestrator 145 can distribute and balance virtual machines 15 that are self-replicated or self-destroyed across hosts in the computing systems 106. The virtual infrastructure orchestrator 145 can include vSphere by VMware® in some examples.

The various physical and virtual components of the computing systems 106 can process workloads 150. Workloads 150 can refer to the amount of processing that a server 115, switch 118, GPU 121, or other physical or virtual component has been instructed to process or route at a given time. The workloads 150 can be associated with virtual machines 15, public cloud services, private cloud services, hybrid cloud services, or other software executing on the servers 115. For instance, the workloads 150 can include tasks to be processed to provide infrastructure-as-a-service (IaaS) computing resources 113, such as public cloud services, private cloud services, hybrid cloud services, or a combination thereof. In another example, the workloads 150 can include tasks to be processed to provide employees of an enterprise with remote desktop sessions or other virtualized computing sessions.

In yet another example, the workloads 150 can include tasks to be processed to provide "serverless" architecture. Serverless architecture refers to function-as-a-service (IaaS) resource in which applications or code can be executed on a remote server offered by a third-party without requiring a developer or an administrator configure and maintain a proprietary server. As can be appreciated, serverless architectures are beneficial when administrators require a small number of software routines be executed, as the administrators do not have to provision, pay for, and maintain a new server.

The virtual infrastructure orchestrator 145 can maintain a listing of active or inactive workloads 150 as well as oversee the assignment of various workloads 150 to various devices in the computing systems 106. For instance, the virtual infrastructure orchestrator 145 can assign a workload 150 lacking in available resources to a server 115 or one or more virtual machines 15 that have resources sufficient to handle the workload 150. The workloads 150 can be routed to various servers 115 by the switches 118 as network traffic 155a . . . 155b.

Next, a general description of the operation of the various components of the networked environment 100 is provided. In some examples, the virtual infrastructure orchestrator 145 can include an application programming interface (API) that can be invoked by the virtual machines 15 autonomously to perform self-replicate and self-destroy operations. Alternatively, in some examples, the virtual machines 15 can invoke an API call to a hypervisor to autonomously to perform self-replicate and self-destroy operations. For instance, a self-replicate routine can be invoked by a virtual machine 15 to invoke an InstantClone operation or a fork operation of itself. In some examples, to self-replicate, a virtual machine 15 can execute a guestRPC by VMware® command using a name for a new virtual machine 15 as an argument. A sample script that performs a self-replication of an existing virtual machine 15 is reproduced below:

```
% # If pre-replication commands
% vmware-rpctool self-replicate <name_of_new_VM>
% # If post-replication commands
```

In some examples, to avoid name collisions between autonomously generated virtual machines 15, the name field may include a randomly-generated universal unique identifier (UUID), guaranteeing that each virtual machine 15 has a unique name to prevent naming collisions.

In some examples, immediately after the self-replicate routine is invoked by a virtual machine 15, the virtual machine 15 can be "stunned," halting any further instructions from being executed. In other words, a processing of the workload 150 by the virtual machine 15 is paused. As can be appreciated, the pausing of the virtual machine 15 prevents any race conditions occurring on the virtual machine 15. For instance, a race condition could include the self-replicate routine and the post-replication commands being executed in an incorrect order.

When the self-replicate routine completes, the virtual machine 15 and the newly-created virtual machine 15 can resume from their paused state. Thereafter, the self-replicate routine can complete, and the virtual machines 15 can execute post-replication commands, if any. In some examples, the pre-replication commands and the post-replication commands include those necessary to perform a self-replication, such as guest networking refresh that prevents a parent virtual machine 15 and a child virtual machine 15 from having network collisions.

To this end, in some examples, the virtual machine 15 can suspend a network interface of the virtual machine 15 before executing the self-replicate routine. After the self-replicate routine is performed, the virtual machine 15 can initiate a network refresh operation on both the parent virtual machine 15 and the child virtual machine 15. The network refresh can include reading a media access control (MAC) address of virtual hardware and requesting a new dynamic host configuration protocol (DHCP) lease. As the InstantClone operation generates a new MAC address, a child virtual machine 15 can be assigned a new internet protocol (IP) address.

In some examples, the self-replicate routine saves a runtime state of a virtual machine 15 invoking the self-replicate routine, where the runtime state includes a state of the memory, disk, CPU, as well as other components of the virtual machine 15. For instance, the self-replicate routine can save a runtime state of a parent virtual machine 15 such that the runtime state can be transferred to a child virtual machine 15, when created. After creation, both the parent virtual machine 15 and the child virtual machine 15 can resume execution independently. As can be appreciated, at least a portion of the workload 150 being processed by the parent virtual machine 15 can be assigned for processing by the child virtual machine 15. Alternatively, a different workload 150 can be assigned to the child virtual machine 15.

In any event, the self-replicate routine can save a state of an operating system of the virtual machine 15 and any applications or services executing thereon, and transfer the state between the parent virtual machine 15 and the child virtual machine 15. In some examples, the self-replicate routine can invoke a copy-on-write routine that preserves a state of a disk and memory such that a fast and efficient disk and memory page transfer is performed between a parent virtual machine 15 and a child virtual machine 15.

The self-replicate routine can include configurations, variables, or routines that permit an administrator to enable or disable self-replicate behavior. For instance, a self-replicate configuration can include "self-replicate.enable" that, when configured, enables self-replication. The self-replicate configuration can also include "self-replicate.propagate" that, when configured, permits any child virtual machines 15 to also self-replicate. As can be appreciated, care should be taken with the "self-replicate.propagate" command as an incorrectly configured workload 150 can cause uncontrolled runaway multiplication of virtual machines 15, thereby producing a fork bomb.

Further, a virtual machine 15 can invoke the self-destruct routine to destroy itself or, in other words, terminate execution. In some examples, the self-destruct routine can be invoked to terminate execution immediately, at a power off of the virtual machine 15 or a host computing system 106, or at another suitable time. The virtual machine 15 is free to invoke either, for instance, whenever processing of a workload 150 has completed or in another situation when the virtual machine 15 is not being used.

The self-destruct routine can include one or more values that can be set to configure self-destruct behavior for a virtual machine 15. For instance, a "self-destruct.enable" configuration can enable self-destruct to be performed autonomously by a virtual machine 15, whereas a "self-destruct.disable" configuration can disable self-destruct. Additionally, a "self-destruct.at-power-off.enabled" configuration can cause the self-destruct routine to be performed when the virtual machine 15 is powered off, whereas a "self-destruct.at-power-off.disabled" configuration can cause the self-destruct routine to be performed immediately. As can be appreciated, when a virtual machine 15 is destroyed, the virtual machine 15 is removed from a list of active virtual machines 133 and any resources of the computing systems 106 used by the virtual machine 15 are made available.

As noted above, when a new virtual machine 15 is created, the workload 150 can be divided upon existing virtual machines 15. In some examples, the virtual machine 15 or the virtual infrastructure orchestrator 145 can invoke a routine to determine how the workload 150 should be divided among active virtual machines 133. In one example, the virtual machine 15 or the virtual infrastructure orchestrator 145 can invoke a "MapReduce" routine to determine how the workload 150 should be divided among active virtual machines 133.

The MapReduce routine can break down large computations into divisible pieces by invoking a "map" routine (which performs filtering and sorting operations) and combining results using a "reduce" routine. As such, a virtual machine 15 can invoke the MapReduce routine to split a workload 150 across two virtual machines 15, and so forth. As merely one example of a benefit that is achieved from using self-replicate by a virtual machine 15, a dataset used by the virtual machine 15 in processing a workload 150 is already loaded in the memory and is automatically shared with a new virtual machine 15 when self-replicated. Once a virtual machine 15 completes processing of an assigned workload 150, the virtual machine 15 can post its results to memory and perform the self-destruct operation to free up computing resources 113. For instance, in a serverless compute system, when an application or other code is required to be executed, a virtual machine 15 can be spawned, if needed, to execute the code. Thereafter, the virtual machine 15 can automatically terminate, for instance, after completion of the processing or after a predetermined amount of time. This can be contrasted with virtual infrastructure orchestrators 145 that are required to manage the entire lifecycle of the virtual machines 15 in a computing environment 10.

In addition to serverless compute systems, the examples described herein can be employed in other systems where disposable computing services are used, such as applications or other code that implement Hadoop routines or Jenkins routines. As such, these applications can implement the self-replicate routine to create new worker virtual machines 15, where the virtual machines 15 automatically self-destruct when no longer needed. In both cases, the workloads 150 can be deployed in a fire-and-forget manner, which can simplify the infrastructure orchestration system.

Further, the examples described herein can be employed in virtual desktop infrastructure environments. For instance, when a user logs into a virtual desktop using his or her client device 108, a virtual machine 15 can self-replicate to create a new virtual machine 15 designated to providing the virtual desktop for the client device 108. When the user logs off the virtual desktop, the virtual machine 15 can self-terminate.

Figure 3:
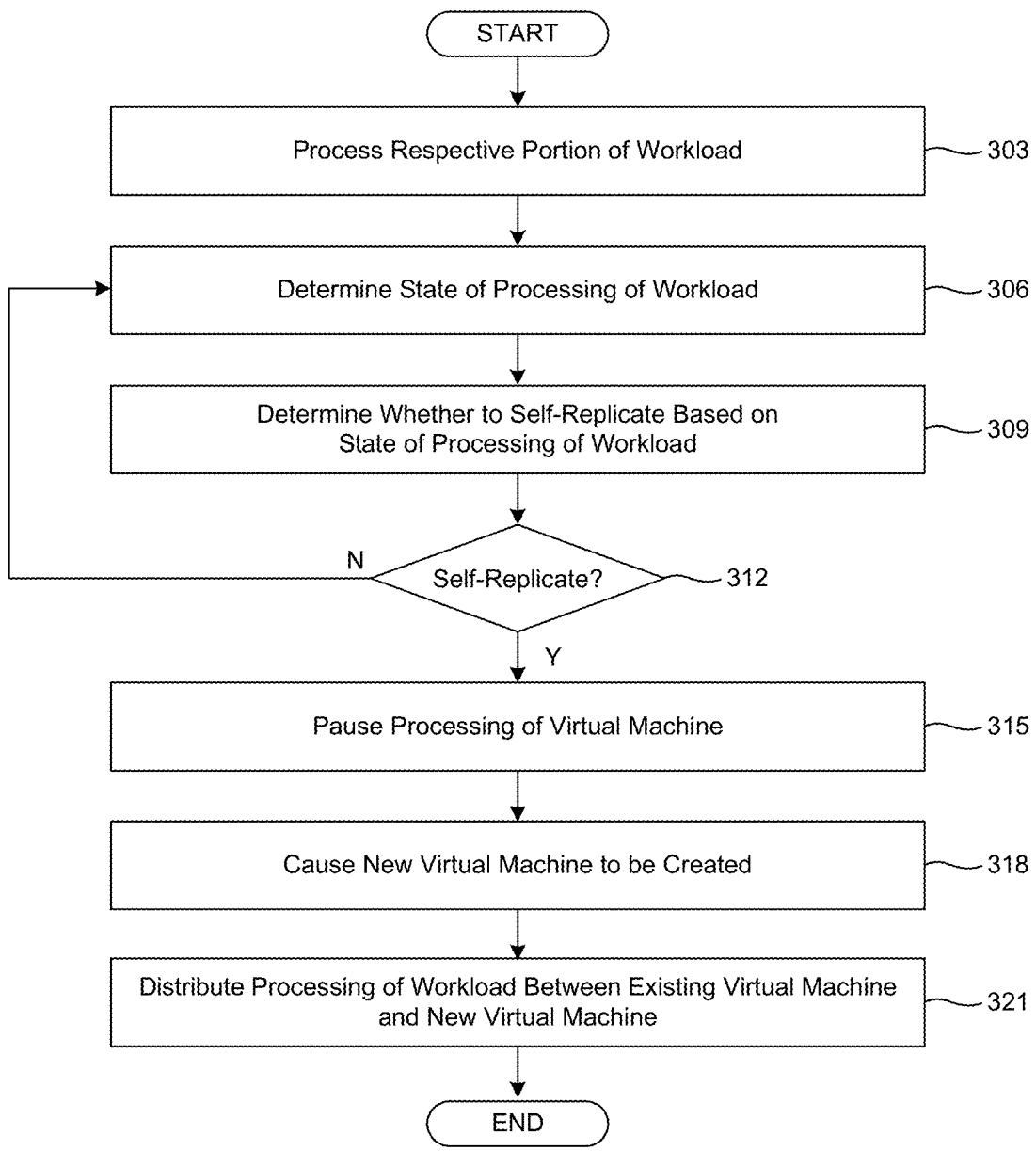
FIG. 3 is a flowchart illustrating functionality implemented by components of the networked computing environment of FIG. 2.

Moving on to FIG. 3, shown is a flowchart that provides one example of the operation of a portion of the networked environment 100. The flowchart of FIG. 3 can be viewed as depicting an example of elements of a method implemented by a virtual machine 15 executing in the computing environment 10 according to one or more examples. The separation or segmentation of functionality as discussed herein is presented for illustrative purposes only.

The virtual infrastructure orchestrator 145 can provision one or more virtual machine 15 in a computing environment 10 having at least one computing device. Each of the virtual machines 15 provisioned can process a workload 150 assigned to the computing environment 10. Further, each of the virtual machines 15 can include logic that independently determines whether to self-replicate or self-destroy based at least on a state of processing of the workload 150. In other words, the virtual machines can determine whether to clone itself or terminate execution, for instance, to scale up or down processing of a workload 150. To self-replicate, each of the virtual machines 15 can cause a new virtual machine 15 to be created, where a processing of the workload 150 is shared between the virtual machines 15.

In some examples, a virtual machine 15 can determine whether to clone itself or terminate execution based at least in part on processing metrics 139 describing only the virtual machine 15. For instance, the processing metrics 139 may indicate that the virtual machine 15 is under a heavy load, thereby causing the virtual machine 15 to clone itself to assist with processing of the workload 150. In other examples, a virtual machine 15 can determine whether to clone itself or terminate execution based on processing metrics 139 describing an overall operation of a system that includes the virtual machine 15 or a group of virtual machines 15. For instance, if the virtual machine 15 is part of a larger collection of virtual machines 15 tasked with processing a workload 150, and the virtual machine 15 is under a heavy load, the virtual machine 15 can clone itself to further assist with the processing of the workload 150.

Beginning with step 303, the virtual machine 15 can process a respective portion of the workload 150. The workloads 150 can include data required to be processed to provide public cloud services, private cloud services, hybrid cloud services, or other software executing on the servers 115. In another example, the workloads 150 can include tasks to be processed to provide employees of an enterprise with remote desktop sessions or other virtualized computing sessions.

In step 306, the virtual machine 15 can determine a state of processing of the workload 150. The state of processing of the workload 150 can be described as one or more operational performance values. Accordingly, in some examples, the virtual machine 15 can generate one or more processing metrics 139 describing the state of processing of the workload 150, or can access processing metrics 139 generated by the computing environment management service 140. For instance, the processing metrics 139 can describe a throughput of processing of the workloads 150 or a workload processing latency. As such, in some examples, the processing metrics 139 include measurements describing an amount of messages that a virtual machine 15 or host processes during a predefined time interval, such as one second or one minute. For instance, the throughput can be calculator as a number of completed requests over an amount of time required to complete the requests. In some examples, the processing metrics 139 include measurements describing the time elapsed between sending a request to a virtual machine 15 and receiving a response from the virtual machine 15.

In step 309, the virtual machine 15 can determine whether to self-replicate, for instance, based on the state of the processing of the workload 150 determined in step 306. For instance, if a processing metric 139 describing a throughput of processing of the workload 150 indicates that the computing environment 10 (or portion thereof) is under a heavy load, the virtual machine 15 can determine to self-replicate. Alternatively, if the processing metric 139 describing a throughput of processing of the workload 150 indicates that the computing environment 10 (or portion thereof) is under a light load, the virtual machine 15 can determine to abstain from self-replicating.

The virtual machine 15 can determine whether the state of the processing of the workload 150 is under a heavy load, light load, moderate load, or other level of load based at least in part on one or more throughput thresholds. For instance, if an operational metric 139 that describes a throughput of processing of the workload 150 exceeds a predefined threshold set for heavy workloads, the virtual machine 15 can determine that the state of the processing of the workload 150 is under a heavy load. Similarly, if the operational metric 139 that describes the throughput of processing of the workload 150 falls below a predefined threshold set for low workloads, the virtual machine 15 can determine that the state of the processing of the workload 150 is under a low load. If the operational metric 139 that describes the throughput of processing of the workload 150 falls below a predefined threshold set for high workloads and above a predefined threshold set for low workloads, the virtual machine 15 can determine that the state of the processing of the workload 150 is under a moderate load.

In additional examples, the virtual machine 15 can determine whether to self-replicate based on an occurrence of a predetermined event that occurred. For instance, when a user logs into a virtual desktop using his or her client device 108, a virtual machine 15 can determine to self-replicate to create a new virtual machine 15 assigned to providing the virtual desktop for the client device 108.

In step 312, if the virtual machine 15 determines to not self-replicate, the process can revert to step 306 where the virtual machine 15 can continue monitoring the state of processing of the workload 150. Alternatively, in step 312, if the virtual machine 15 determines to self-replicate, the process can proceed to step 315.

In step 315, the virtual machine 15 can pause a processing of the workload 150. As can be appreciated, the pausing of the virtual machine 15 prevents any race conditions occurring on the virtual machine 15. For instance, a race condition could include the self-replicate routine and post-replication commands being executed in an incorrect order.

Next, in step 318, the virtual machine 15 can cause a new virtual machine 15 to be created. For instance, a self-replicate routine can be invoked by the virtual machine 15 to invoke an InstantClone operation or a fork operation of itself. In some examples, to self-replicate, a virtual machine 15 can execute a guestRPC by VMware® command using a name for a new virtual machine 15 as an argument. In some examples, the virtual machine 15 can cause a new virtual machine 15 to be created by sending a command to an orchestrator or other management component that causes the orchestrator or other management component to create a new virtual machine 15. The orchestrator or other management component can include a component external to a host (or a server 115) in some examples. Further, the orchestrator or other management component can use an image for the virtual machine 15 or settings for the virtual machine 15 to create a clone of the virtual machine 15.

In other examples, the virtual machine 15 can clone itself without an orchestrator or other management component external to the host. For instance, a hypervisor 126 of a host can determine whether to clone a virtual machine 15. In other examples, the virtual machine 15 can send a request to the hypervisor 126 to clone the virtual machine 15. As such, the hypervisor 126 can validate the request if received from the virtual machine 15.

Further, in some examples, the virtual machine 15 may not be trusted to determine whether to perform a clone operation; however, the decision whether to clone the virtual machine 15 can still be made locally on a host or a server 115. As such, a hypervisor 126 of the same host on which a virtual machine 15 is executing can determine whether to perform a clone operation on behalf of a virtual machine 15 which can be beneficial as the hypervisor 126 is logically isolated from the virtual machine 15. The hypervisor 126 can monitor the capacity of the virtual machine 15 as the hypervisor 126 oversees execution of the virtual machine 15 on a host. Further, the hypervisor 126 can monitor available capacity of the host. Accordingly, in some examples, the hypervisor 126 may cause the virtual machine 15 to be cloned, for instance, by performing the cloning operations or by sending a request to another component to perform the cloning operations.

When the self-replicate routine completes, the virtual machine 15 and the newly-created virtual machine 15 can resume from their paused state. Thereafter, the self-replicate routine can complete and the virtual machines 15 can execute post-replication commands, if any. In some examples, the pre-replication commands and the post-replication commands include those necessary to perform a self-replication, such as guest networking refresh that prevents a parent virtual machine 15 and a child virtual machine 15 from having network collisions.

In step 321, the virtual machine 15 can distribute the processing of the workload 150 between the existing virtual machine 15 and the new virtual machine 15. In some examples, the virtual machine 15 or the virtual infrastructure orchestrator 145 can invoke a routine to determine how the workload 150 should be divided among active virtual machines 133. In one example, the virtual machine 15 or the virtual infrastructure orchestrator 145 can invoke a "MapReduce" routine to determine how the workload 150 should be divided among active virtual machines 133. Notably, a dataset used by the existing virtual machine 15 in processing a workload 150 is already loaded in the memory and can be automatically shared with a new virtual machine 15 when self-replicated. Once a virtual machine 15 completes processing of an assigned workload 150, the virtual machine 15 can post its results to memory and perform the self-destruct operation to free up computing resources 113, as will be discussed in FIG. 4. Thereafter, the process can proceed to completion.

Figure 4:
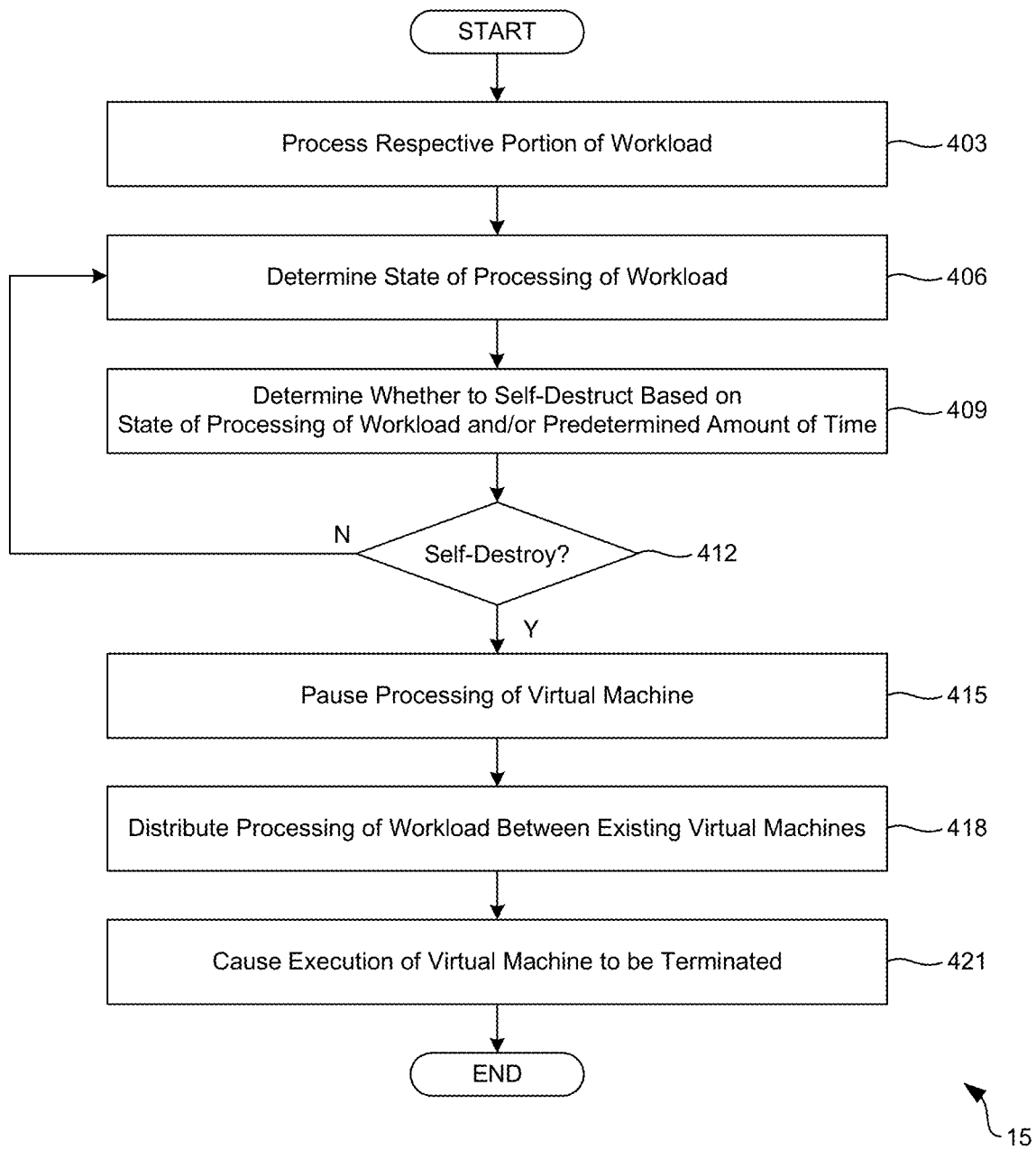
FIG. 4 is another flowchart illustrating functionality implemented by components of the networked computing environment of FIG. 2.

Moving on to FIG. 4, shown is a flowchart that provides one example of the operation of a portion of the networked environment 100. The flowchart of FIG. 4 can be viewed as depicting an example of elements of a method implemented by a virtual machine executing in the computing environment 10 according to one or more examples. The separation or segmentation of functionality as discussed herein is presented for illustrative purposes only.

Beginning with step 403, the virtual machine 15 can process a respective portion of the workload 150. The workloads 150 can include data required to be processed to provide public cloud services, private cloud services, hybrid cloud services, or other software executing on the servers 115. In another example, the workloads 150 can include tasks to be processed to provide employees of an enterprise with remote desktop sessions or other virtualized computing sessions.

In step 406, the virtual machine 15 can determine a state of processing of the workload 150. In some examples, the virtual machine 15 can generate one or more processing metrics 139 describing the state of processing of the workload 150, or can access processing metrics 139 generated by the computing environment management service 140. For instance, the processing metrics 139 can describe a throughput of processing of the workloads 150.

In step 409, the virtual machine 15 can determine whether to self-destroy, for instance, based on the state of the processing of the workload 150 determined in step 406. For instance, if a processing metric 139 describing a throughput of processing of the workload 150 indicates that the computing environment 10 (or portion thereof) is under a light load, the virtual machine 15 can determine to self-destroy. Alternatively, if the processing metric 139 describing a throughput of processing of the workload 150 indicates that the computing environment 10 (or portion thereof) is under a heavy load, the virtual machine 15 can determine to abstain from self-destroying.

In additional examples, the virtual machine 15 can determine whether to self-destroy based on an occurrence of a predetermined event that occurred or after an elapse of a predetermined amount of time. For instance, when a user logs off a virtual desktop using his or her client device 108, the virtual machine 15 can determine to self-destroy. Alternatively, when an application or service finishes execution in a serverless compute system, the virtual machine 15 can determine to self-destroy.

In step 412, if the virtual machine 15 determines not to self-destroy, the process can revert to step 406 where the virtual machine 15 can continue monitoring the state of processing of the workload 150. Alternatively, in step 412, if the virtual machine 15 determines to self-destroy, the process can proceed to step 415.

In step 415, the virtual machine 15 can pause a processing of the workload 150 or otherwise temporarily half processing of a workload 150. As can be appreciated, pausing the virtual machine 15 can prevent any race conditions occurring on the virtual machine 15 in the event a fork or a clone operation is performed.

Next, in step 418, the virtual machine 15 can distribute the processing of the workload 150 among existing virtual machines 15 or to its parent virtual machine 15. In some examples, the virtual machine 15 or the virtual infrastructure orchestrator 145 can invoke the "MapReduce" routine to determine how the workload 150 should be divided among active virtual machines 133.

Next, in step 421, the virtual machine 15 can cause itself to be terminated. In some examples, the virtual machine 15 can cause itself to be terminated by sending a command to an orchestrator or other management component that causes the orchestrator or other management component to terminate execution of the virtual machine 15. For instance, the virtual machine 15 can invoke the self-destroy routine that directs the virtual infrastructure orchestrator 145 to terminate the virtual machine 15 by passing a unique identifier for the virtual machine 15 to the virtual infrastructure orchestrator 145.

In other examples, the virtual machine 15 may not be trusted to determine whether to terminate itself. Instead, the decision whether to terminate execution of the virtual machine 15 can still be made locally on a host or a server 115. For instance, a hypervisor 126 of the same host on which a virtual machine 15 is executing can determine whether to terminate execution on behalf of a virtual machine 15 which can be beneficial as the hypervisor 126 is logically isolated from the virtual machine 15. The hypervisor 126 can monitor the capacity of the virtual machine 15 as the hypervisor 126 oversees execution of the virtual machine 15 on a host. Further, the hypervisor 126 can monitor available capacity of the host. Accordingly, in some examples, the hypervisor 126 may cause the virtual machine 15 to be terminated, for instance, by performing invoking a "kill" command or by sending a request to another component to terminate execution of the virtual machine 15.

As a result of the virtual machine 15 being terminated, any computing resources 113 used by the virtual machine 15 are freed up for use by other virtual machines 15, applications, or services. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the computing environment management service 140. These client devices 108 can include a display upon which a user interface generated by a client application for providing a virtual desktop session (or other session) can be rendered. In some examples, the user interface can be generated using user interface data provided by the computing environment 10. The client device 108 can also include one or more input/output devices that can include, for example, a capacitive touchscreen or other type of touch input device, fingerprint reader, or keyboard.

Although the computing environment management service 140 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for replicating a virtual machine in a cluster to autonomously scale up or down a processing of a workload, comprising:
   at least one computing device;
   program instructions stored in memory and executable in the at least one computing device that, when executed by the at least one computing device, direct the at least one computing device to:
      provision a plurality of virtual machines in the at least one computing device;
      process, by one of the virtual machines, a first portion of the workload assigned to the at least one computing device, wherein the one of the virtual machines comprises logic to determine whether to self-replicate, the one of the virtual machines is associated with a self-replicate permission and a self-destruct permission, a value of the self-replicate permission specifies that the one of the virtual machines is permitted or not to self-replicate, and a value of the self-destruct permission specifies that the one of the virtual machines is permitted or not to self-destruct;
      determine, by the one of the virtual machines, to self-replicate based at least on a state of processing of the workload and the value of the self-replicate permission; and
      in response to a determination to self-replicate made by the one of the virtual machines, call, by the one of the virtual machines, an instant cloning routine using an identifier that uniquely identifies the one of the virtual machines to cause a new one of the virtual machines to be created by the one of the virtual machines, wherein at least a second portion of the processing of the workload is divided between the one of the virtual machines and the new one of the virtual machines.

2. The system of claim 1, wherein the at least one computing device is further directed to:
   determine, by the one of the virtual machines, to self-destruct based at least in part on at least one of:
      (i) the state of processing of the workload; and
      (ii) an elapse of a predetermined amount of time;
      (iii) the value of the self-destruct permission; and
   in response to a determination to self-destruct made by the one of the virtual machines, cause, by the one of the virtual machines, an execution of the one of the virtual machines to be terminated and the one of the virtual machines to be deleted from memory.

3. The system of claim 2, wherein the one of the virtual machines is deleted from memory by deleting the one of the virtual machines from a physical disk storage device or a virtual disk storage device.

4. The system of claim 1, wherein the new one of the virtual machines is created by:
   pausing, by the one of the virtual machines, the processing of the workload;
   saving, by the one of the virtual machines, a state of the one of the virtual machines after the processing of the workload has been paused;
   calling, by the one of the virtual machines, a routine that spawns a creation of the new one of the virtual machines; and
   resuming, by the one of the virtual machines, the processing of the workload.

5. The system of claim 1, wherein the determination to self-replicate made by the one of the virtual machines is determined by:
   accessing, by the one of the virtual machines, a metric describing a throughput of the workload; and
   determining, by the one of the virtual machines, to self-replicate based at least in part on the metric meeting a predetermined threshold.

6. The system of claim 1, wherein the new one of the virtual machines created inherits the self-replicate permission and the self-destruct permission from the one of the virtual machines.

7. The system of claim 1, wherein the one of the virtual machines determines to self-replicate based at least in part on a maximum amount of usable computing resources.

8. A non-transitory computer-readable medium for replicating a virtual machine in a cluster to autonomously scale up or down a processing of a workload, comprising program code executable in at least one computing device that, when executed by the at least one computing device, directs the at least one computing device to:
   provision a plurality of virtual machines in the at least one computing device;
   process, by one of the virtual machines, a first portion of the workload assigned to the at least one computing device, wherein the one of the virtual machines comprises logic to determine whether to self-replicate, the one of the virtual machines is associated with a self-replicate permission and a self-destruct permission, a value of the self-replicate permission specifies that the one of the virtual machines is permitted or not to self-replicate, and a value of the self-destruct permission specifies that the one of the virtual machines is permitted or not to self-destruct;

determine, by the one of the virtual machines, to self-replicate based at least on a state of processing of the workload and the value of the self-replicate permission; and in response to a determination to self-replicate made by the one of the virtual machines, call, by the one of the virtual machines, an instant cloning routine using an identifier that uniquely identifies the one of the virtual machines to cause a new one of the virtual machines to be created by the one of the virtual machines, wherein at least a second portion of the processing of the workload is divided between the one of the virtual machines and the new one of the virtual machines.

9. The non-transitory computer-readable medium of claim 8, wherein the at least one computing device is further directed to:

determine, by the one of the virtual machines, to self-destruct based at least in part on at least one of:
(i) the state of processing of the workload; and
(ii) an elapse of a predetermined amount of time;
(iii) the value of the self-destruct permission; and in response to a determination to self-destruct made by the one of the virtual machines, cause, by the one of the virtual machines, an execution of the one of the virtual machines to be terminated and the one of the virtual machines to be deleted from memory.

10. The non-transitory computer-readable medium of claim 9, wherein the one of the virtual machines is deleted from memory by deleting the one of the virtual machines from a physical disk storage device or a virtual disk storage device.

11. The non-transitory computer-readable medium of claim 8, wherein the new one of the virtual machines is created by:

pausing, by the one of the virtual machines, the processing of the workload;

saving, by the one of the virtual machines, a state of the one of the virtual machines after the processing of the workload has been paused;

calling, by the one of the virtual machines, a routine that spawns a creation of the new one of the virtual machines; and resuming, by the one of the virtual machines, the processing of the workload.

12. The non-transitory computer-readable medium of claim 8, wherein the determination to self-replicate made by the one of the virtual machines is determined by:

accessing, by the one of the virtual machines, a metric describing a throughput of the workload; and determining, by the one of the virtual machines, to self-replicate based at least in part on the metric meeting a predetermined threshold.

13. The non-transitory computer-readable medium of claim 8, wherein the new one of the virtual machines created inherits the self-replicate permission and the self-destruct permission from the one of the virtual machines.

14. A computer-implemented method for replicating a virtual machine in a cluster to autonomously scale up or down a processing of a workload, comprising:

provisioning a plurality of virtual machines in at least one computing device;

processing, by one of the virtual machines, a first portion of the workload assigned to the at least one computing device, wherein the one of the virtual machines comprises logic to determine whether to self-replicate, the one of the virtual machines is associated with a self-replicate permission and a self-destruct permission, a value of the self-replicate permission specifies that the one of the virtual machines is permitted or not to self-replicate, and a value of the self-destruct permission specifies that the one of the virtual machines is permitted or not to self-destruct;

determining, by the one of the virtual machines, to self-replicate based at least on a state of processing of the workload and the value of the self-replicate permission; and in response to a determination to self-replicate made by the one of the virtual machines, calling, by the one of the virtual machines, an instant cloning routine using an identifier of the one of the virtual machines to cause a new one of the virtual machines to be created by the one of the virtual machines, wherein at least a second portion of the processing of the workload is divided between the one of the virtual machines and the new one of the virtual machines.

15. The computer-implemented method of claim 14, further comprising:

determining, by the one of the virtual machines, to self-destruct based at least in part on at least one of:
(i) the state of processing of the workload; and
(ii) an elapse of a predetermined amount of time;
(iii) the value of the self-destruct permission; and in response to a determination to self-destruct made by the one of the virtual machines, causing, by the one of the virtual machines, an execution of the one of the virtual machines to be terminated and the one of the virtual machines to be deleted from memory.

16. The computer-implemented method of claim 15, wherein the one of the virtual machines is deleted from memory by deleting the one of the virtual machines from a physical disk storage device or a virtual disk storage device.

17. The computer-implemented method of claim 14, wherein the new one of the virtual machines is created by:

pausing, by the one of the virtual machines, the processing of the workload;

saving, by the one of the virtual machines, a state of the one of the virtual machines after the processing of the workload has been paused;

calling, by the one of the virtual machines, a routine that spawns a creation of the new one of the virtual machines; and resuming, by the one of the virtual machines, the processing of the workload.

18. The computer-implemented method of claim 14, wherein the determination to self-replicate made by the one of the virtual machines is determined by:

accessing, by the one of the virtual machines, a metric describing a throughput of the workload; and determining, by the one of the virtual machines, to self-replicate based at least in part on the metric meeting a predetermined threshold.

19. The computer-implemented method of claim 14, wherein the new one of the virtual machines created inherits the self-replicate permission and the self-destruct permission from the one of the virtual machines.

20. The computer-implemented method of claim 14, wherein the determining, by the one of the virtual machines, to self-replicate is performed using a maximum amount of usable computing resources.

* * * * *